(12) United States Patent
Calderon et al.

(10) Patent No.: US 8,494,363 B2
(45) Date of Patent: Jul. 23, 2013

(54) SIGNAL FORMAT CONVERSION APPARATUS AND METHODS

(75) Inventors: Juan-Carlos Calderon, Fremont, CA (US); Jean-Michel Caia, Plymouth, CA (US); Arun Zarabi, Sacramento, CA (US); Aws Shallal, Cary, NC (US); Theron Paul Niederer, Raleigh, NC (US)

(73) Assignee: Cortina Systems, Inc., Sunnyvale, CA (US)

( * ) Notice: Subject to any disclaimer, the term of this patent is extended or adjusted under 35 U.S.C. 154(b) by 279 days.

(21) Appl. No.: 13/091,908

(22) Filed: Apr. 21, 2011

(65) Prior Publication Data
US 2012/0269511 A1   Oct. 25, 2012

(51) Int. Cl.
*H04B 10/00*   (2006.01)

(52) U.S. Cl.
USPC .............. 398/43; 398/154; 370/503; 370/506

(58) Field of Classification Search
USPC ...................... 398/43, 154, 155; 370/503–520
See application file for complete search history.

(56) References Cited

U.S. PATENT DOCUMENTS

| | | | |
|---|---|---|---|
| 7,020,094 B2 * | 3/2006 | Heiles | 370/252 |
| 7,602,814 B2 * | 10/2009 | Meagher et al. | 370/505 |
| 7,787,448 B2 * | 8/2010 | Zhang | 370/389 |
| 7,848,653 B2 * | 12/2010 | Zou | 398/72 |
| 8,050,567 B2 * | 11/2011 | Miller et al. | 398/98 |
| 8,059,684 B2 * | 11/2011 | Xiao et al. | 370/474 |
| 8,170,421 B2 * | 5/2012 | Li | 398/154 |
| 8,195,049 B1 * | 6/2012 | Miller et al. | 398/98 |
| 2007/0269218 A1 * | 11/2007 | Zhang | 398/140 |
| 2010/0074624 A1 * | 3/2010 | Miller et al. | 398/98 |
| 2010/0226652 A1 * | 9/2010 | Vissers et al. | 398/98 |
| 2011/0229133 A1 * | 9/2011 | Katagiri et al. | 398/58 |
| 2011/0262128 A1 * | 10/2011 | Madrahalli et al. | 398/2 |
| 2012/0039609 A1 * | 2/2012 | Dong et al. | 398/66 |
| 2012/0106956 A1 * | 5/2012 | Rao et al. | 398/52 |
| 2012/0269511 A1 * | 10/2012 | Calderon et al. | 398/58 |

OTHER PUBLICATIONS

G.709/Y.1331, Interfaces for the Optical Transport Network (OTN), ITU-T, (Dec. 2009), 218 pages.
Covering Note Erratum 1 (May 2010) to Recommendation ITU-T G.709/Y.1331 (Dec. 2009), Interfaces for the Optical Transport Network (OTN), 1 page.
G.709/Y.1331, Interfaces for the Optical Transport Network (OTN) Amendment 1, ITU-T, (Jul. 2010), 16 pages.

(Continued)

*Primary Examiner* — Agustin Bello
(74) *Attorney, Agent, or Firm* — Turocy & Watson, LLP (57) ABSTRACT

Signal format conversion apparatus and methods involve converting data signals between a first signal format associated with a first reference clock rate and a second signal format that is different from the first signal format and is associated with a second reference clock rate different from the first reference clock rate. A period of the second signal format is changed to match a period of a third signal format by controlling a synchronized second reference clock rate that is applied in converting data signals between the first signal format and the second signal format. The synchronized second reference clock rate is different from the second reference clock rate and is synchronized with a third reference clock rate. The third reference clock rate is associated with the third signal format. Such synchronization simplifies conversion of signals between the second and third signal formats.

20 Claims, 10 Drawing Sheets

OTHER PUBLICATIONS

G.709/Y.1331, Interfaces for the Optical Transport Network (OTN) Corrigendum 1, ITU-T, (Jul. 2010), 24 pages.

G.798.1, Types and characteristics of optical transport network equipment, ITU-T, (Apr. 2011), 32 pages.

G.872, Architecture of optical transport networks, ITU-T, (Nov. 2001), 72 pages.

G.872, Architecture of optical transport networks Amendment 1, ITU-T, (Dec. 2003), 10 pages.

G.872, Architecture of optical transport networks Corrigendum 1, ITU-T, (Jan. 2005), 10 pages.

G.872, Architecture of optical transport networks Amendment 2, ITU-T, (Jul. 2010), 14 pages.

* cited by examiner

| Column Row | 1 | 7 | 8 | 14 | 15 | 16 | 17 | 3824 | 3824 | 4080 |
|---|---|---|---|---|---|---|---|---|---|---|
| 1 | FA | OH | OTUk | OH | OPUk OH | | OPUk Payload (4 x 3808 bytes) | | OTUk FEC (4 x 256 bytes) | |
| 2 | ODUk | | OH | | | | | | | |
| 3 | | | | | | | | | | |
| 4 | | | | | | | | | | |

FIG. 3A

| FA | OH | OTUk | OH |
|---|---|---|---|

| | Column # | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| 1 | FAS | | | | | | MFAS | SM | | | GCC0 | | RES | |

SIGNAL FORMAT CONVERSION APPARATUS AND METHODS

FIELD OF THE INVENTION

This invention relates generally to communications and, in particular, to conversion of signals between different signal formats.

BACKGROUND

Conversion of data signals between different signal formats and signal rates can be a challenge, particularly where signal formats use different transport containers and/or independent reference clocks.

The Optical Transport Hierarchy (OTH), for example, is a transport technology for the Optical Transport Network (OTN) developed by the International Telecommunication Union (ITU). The main implementation of OTH is described in two recommendations by the Telecommunication Standardization section of the ITU (ITU-T), including:

Recommendation G.709/Y.1331, entitled "Interfaces for the Optical Transport Network (OTN)", December 2009, with an Erratum 1 (May 2010), an Amendment 1 (July 2010), and a Corrigendum 1 (July 2010); and Recommendation G.872, entitled "Architecture of optical transport networks", November 2001, with an Amendment 1 (December 2003), a Correction 1 (January 2005), and an Amendment 2 (July 2010).

G.709 defines a number of layers in an OTN hierarchy. Client signals are encapsulated into Optical channel Payload Unit (OPUk) signals at one of k levels using either an asynchronous mapping procedure or a synchronous mapping procedure. In the synchronous mapping procedure, the OPUk reference clock is derived from the client signals. This represents the only level of synchronization of transport containers or frames in OTN. Converting between different levels (k) within OTN involves asynchronous processes.

BRIEF DESCRIPTION OF THE DRAWINGS

Examples of embodiments will now be described in greater detail with reference to the accompanying drawings.

DETAILED DESCRIPTION

Aspects of the present disclosure relate to conversion of OTN signals between different levels or signal formats in the OTN signal hierarchy. Synchronization of reference clock signals between different formats that are normally associated with respective different and independent reference clock signals simplifies format conversion. The period of signals in one format can be changed using a synchronized reference clock, to match the period of signals in a different format. This facilitates conversion of signals between the two signal formats by copying signal content rather than performing a more complex asynchronous demapping and mapping process.

In one embodiment, such synchronization is applied at OTN level 3, to change the period of an ODTU3.ts structure to match the period of an ODTU4.ts structure, as discussed in detail below. Reference clocks that are used in converting between signal formats at lower-rate client devices can be synchronized with transmit and receive clocks at a higher-rate device, to simplify additional signal conversions that are performed at the higher-rate device.

These and other aspects are disclosed herein. The present disclosure first considers optical networks and the OTN signal hierarchy in general, with examples of signal formats within the OTN signal hierarchy. Illustrative examples of devices supporting signal format translation or conversion and signal format conversion processes are then described in detail.

Example Optical Communication System

Figure 1:
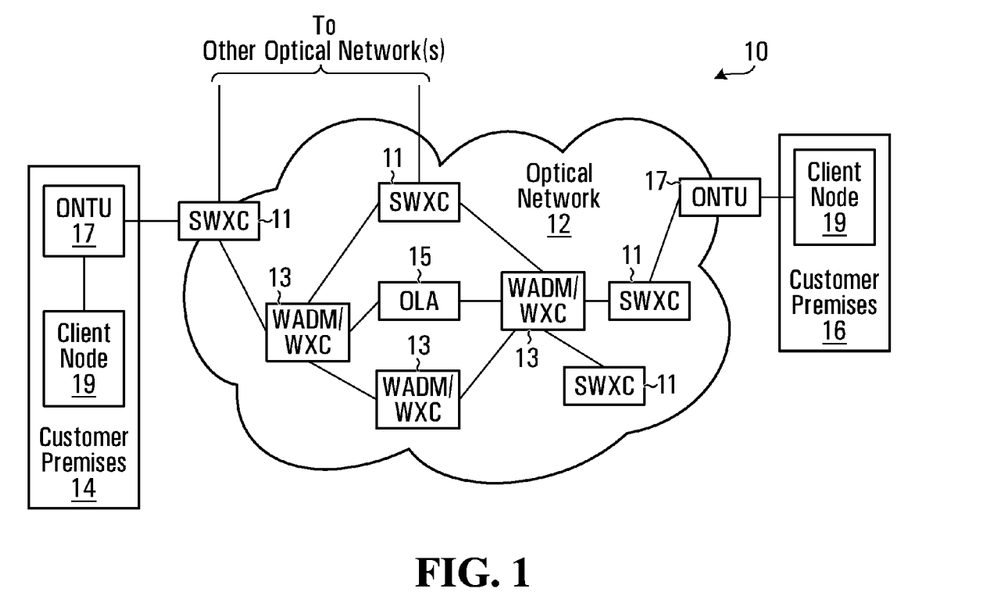
FIG. 1 is a block diagram of an example optical communication system.

FIG. 1 is a block diagram of an example optical communication system 10, which includes an optical network 12 and customer premises 14, 16, which in turn include different types of OTN equipment. At the customer premises 14, 16, there are client nodes 19, and the customer premises 14 also includes an OTN Network Termination Unit (ONTU) 17. Within the optical network 12, there are ONTUs, one of which is shown in the example system 10, Wavelength Add Drop Multiplexers/Cross Connects (WADM/WXC) 13, Sub-wavelength Cross Connects (SWXCs) 11, and Optical Line Amplifiers (OLAs), one of which is shown at 15.

OTN networks, equipment, and their operation are described, for example, in ITU Recommendation G.798.1, entitled "Types And Characteristics Of Optical Transport Network (OTN) Equipment", April 2011. Aspects of the present disclosure could be implemented, for example, to convert electrical signals between different signal formats at the ONTUs 17, the SWXCs 11, and/or in any of the other customer or network equipment in which electrical signals are handled.

Example Signals for Conversion

Figure 2:
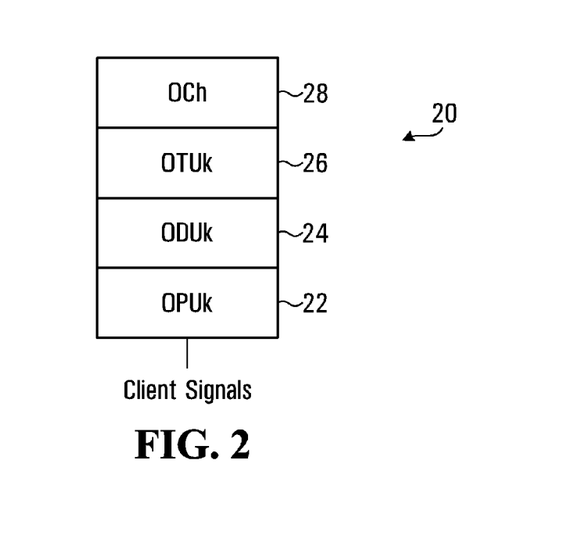
FIG. 2 is a block diagram of an OTN signal hierarchy.

FIG. 2 is a block diagram of an OTN signal hierarchy. This signal hierarchy 20 includes the OPUk signal 22, which is a signal that encapsulates client signals and handles any rate justification. The Optical channel Data Unit (ODUk) signal 24 carries the OPUk signal 22 and supports additional functions such as monitoring and protection switching. The Optical channel Transport Unit (OTUk) signal 26 adds Forward Error Correction (FEC) coding and further monitoring functions. The OPUk signal 22, the ODUk signal 24, and the OTUk signal 26 are all in the electrical domain. The Optical Channel (OCh) signal 28 is in the optical domain, and is a result of converting the OTUk signal 26 to optical form. Although not explicitly shown in FIG. 2, OPUk signals 26 could be multiplexed into Optical channel Transport Lane (OTL) signals instead of OCh signals.

G.709 currently defines several levels or types (k) of OPUk, ODUk, and OTUk, each having respective associated signal rates. For level or type 1, for example, the OPU2 nominal signal rate is 238/237×9,953,280 kilobits/second (kbps), the ODU2 nominal signal rate is 239/237×9,953,280 kbps, and the OTU2 nominal signal rate is 255/237×9,953,280 kbps, or roughly 10 G. For OPU3, ODU3, and OTU3, the signal rates are 238/236×39,813,120 kbps, 239/236×39,813,120 kbps, and 255/236×39,813,120 kbps, respectively, or roughly 40 G. The signal rates for OPU4, ODU4, and OTU4 are roughly 100 G, at 238/227×99,532,800 kbps, 239/227×99,532,800 kbps, and 255/227×99,532,800 kbps, respectively.

Aspects of the present disclosure relate to conversions between different levels (k) in the OTN signal hierarchy, between levels 3 and 4, for instance.

Figure 3A:
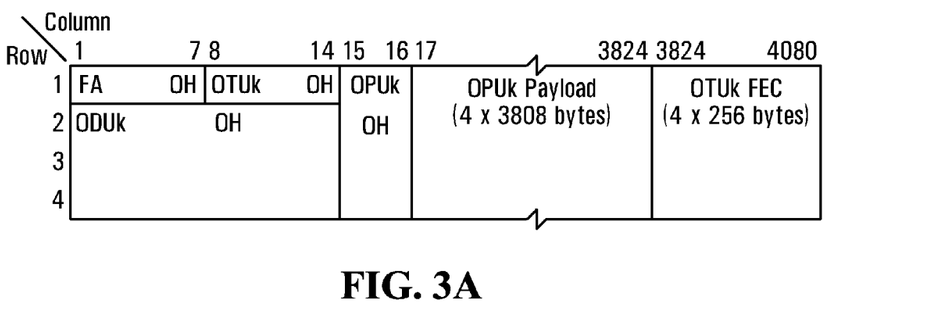
FIGS. 3A through 3D form a block diagram of an OTN frame format.

FIGS. 3A through 3D form a block diagram of an OTN frame format, and illustrate the electrical domain signals shown in FIG. 1 in more detail. The OTN frame format is an OTUk frame, which includes 4 rows of 4080 byte-wide columns, as shown in FIG. 3A. The first 14 columns of row 1 are frame alignment overhead (FA OH), the first 14 columns of rows 2 through 4 are ODUk OH, columns 15 and 16 are OPUk OH, the next 3808 columns 17 through 3824 are an OPUk payload area, and the final 256 columns carry OTUk FEC codes.

Figure 3B:
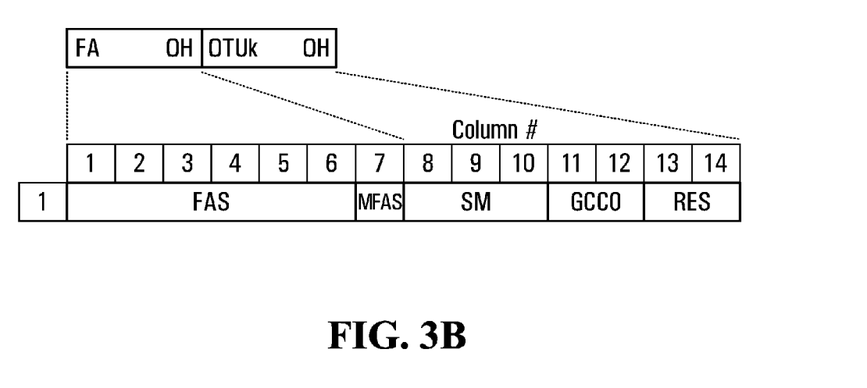
Figure 3C:
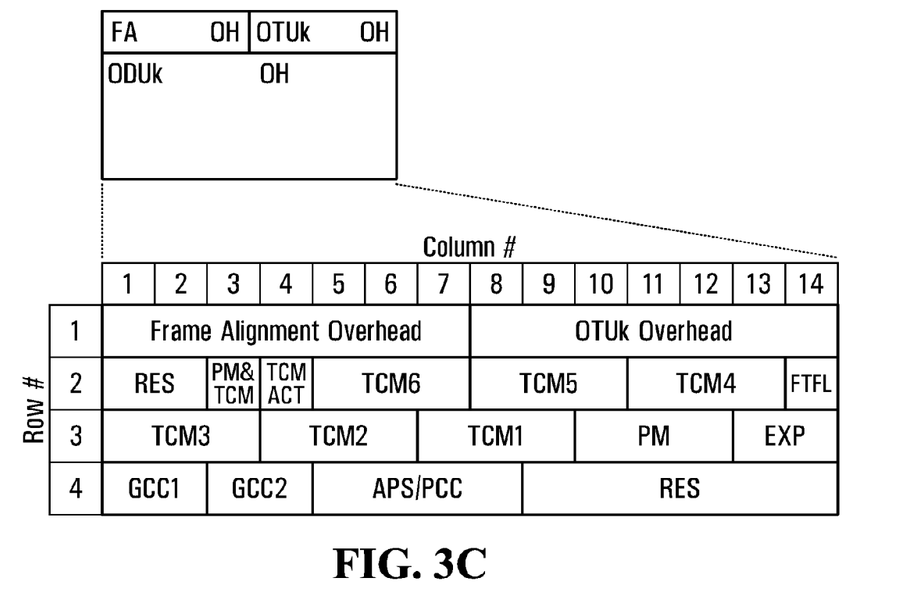
Figure 3D:
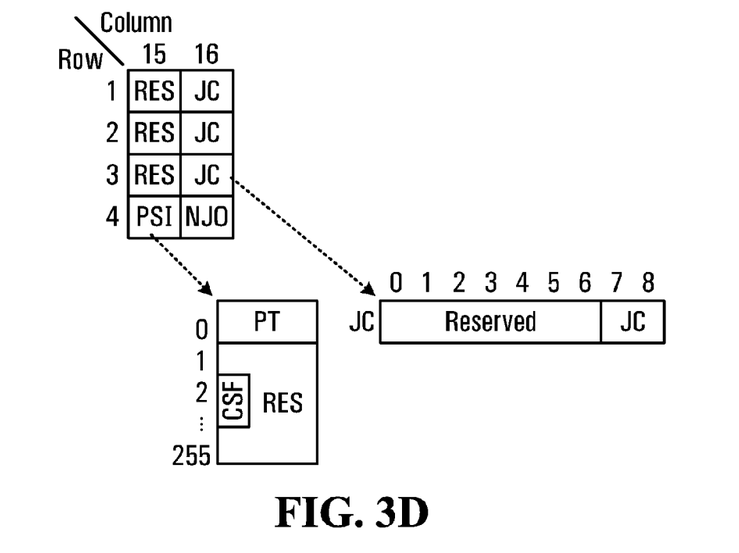

Details of the various OH sections are shown in FIGS. 3B through 3D. The OH fields are as follows, for the FA OH and the OTUk OH (FIG. 3B):
FAS—Frame Alignment Signal
GCC—General Communication Channel
MFAS—MultiFrame Alignment Signal
RES—Reserved for future international standardization
SM—Section Monitoring,
for the ODUk OH (FIG. 3C):
PM—Path Monitoring
TCM—Tandem Connection Monitoring
PM & TCM—Path Monitoring & Tandem Connection Monitoring
RES—Reserved for future international standardisation
ACT—Activation/deactivation control channel
FTFL—Fault Type & Fault Location reporting channel
EXP—Experimental
GCC—General Communication Channel
APS—Automatic Protection Switching coordination channel
PCC—Protection Communication Control channel,
and for the OPUk OH (FIG. 3D):
RES—reserved for future international standardization
PSI—Payload Structure Identifier
PT—Payload Type
CSF—Client Signal Fail
JC—Justification Control
NJO—Negative Justification Opportunity.

The manner in which client signals are encapsulated into OPUk signals and generation of ODUk and OTUk signals are defined in detail in G.709, which also provides additional details regarding signal formats.

There are provisions in G.709 for multiplexing Lower Order (LO) ODUj signals into Higher Order (HO) OPUk signals. However, multiplexing according to G.709 is accomplished through asynchronous mapping processes, which complicates the multiplexing between signal levels or types. An ODTU signal is defined as an "intermediate" for the purposes of multiplexing. The ODTU signal carries a justified ODU signal. There are two types of ODTU signals. In an ODTUjk signal, (j,k)={(0,1), (1,2), (1,3), (2,3)}, an LO ODUj signal is mapped via the Asynchronous Mapping Procedure (AMP) defined in clause 19.5 of G.709. The Generic Mapping Procedure (GMP) defined in clause 19.6 of G.709 is used to map an LO ODU signal into an ODTUk.ts ((k,ts)=(2, 1 ... 8), (3, 1 ... 32), (4, 1 ... 80)) signal. An ODTU signal is subsequently multiplexed into an HO OPUk signal.

The present disclosure relates primarily to multiplexing, and concentrates on multiplexing using ODTUk.ts signals as an illustrative example. However, the present disclosed techniques could potentially be applied to other signal structures, and even to signal formats outside OTN.

According to G.709, the HO OPUk signal is divided into a number of tributary slots (TSs), and these TSs are interleaved within the OPUk signal. A TS includes a part of the OPUk OH area and a part of the OPUk payload area. In G.709, there are two types of TSs, including a TS with a bandwidth of approximately 2.5 G (an OPUk is divided into n TSs, numbered 1 to n), and a TS with a bandwidth of approximately 1.25 G (an OPUk is divided into 2n TSs, numbered 1 to 2n).

As set out in G.709, an OPU3 signal is divided into sixteen 2.5 G tributary slots numbered 1 to 16, or into thirty-two 1.25 G TS numbered 1 to 32. An OPU3 2.5 G TS occupies 6.25% of the OPU3 payload area. It is a structure with 238 columns by 64 (16×4) rows plus TS overhead (TSOH). The sixteen OPU3 2.5 G TSs are byte interleaved in the OPU3 payload area and the sixteen OPU3 TSOHs are frame interleaved in the OPU3 overhead area. An OPU3 1.25 G TS occupies 3.125% of the OPU3 payload area. It is a structure with 119 columns by 128 (32×4) rows plus TSOH. The thirty-two OPU3 1.25 G TSs are byte interleaved in the OPU3 payload area and the thirty-two OPU3 TSOHs are frame interleaved in the OPU3 overhead area.

An OPU3 2.5 G TS "i" (i=1, 2, ... 16) is provided by two OPU3 1.25 G tributary slots "i" and "i+16". The TSOH of OPU3 TSs is located in column 16 plus column 15, rows 1, 2 and 3 of the OPU3 frame. TSOH for a 2.5 G tributary slot is available once every 16 frames. A 16-frame multiframe structure is used for this assignment. This multiframe structure is locked to bits 5 to 8 of the MFAS byte. TSOH for a 1.25 G TS is available once every 32 frames. A 32-frame multiframe structure is used for this assignment, and is locked to bits 4 to 8 of the MFAS byte.

80-column and 160-column OPU4 1.25 Gigabits/second TS allocations are also set out in G.709. An OPU4 is divided into 80 1.25 G TSs (numbered 1 to 80), which are located in columns 17 to 3816, and 8 columns of fixed stuff located in columns 3817 to 3824. The OPU4 frame may be represented in a 320 row by 3810 column format and in a 160 row by 7620 column format. An OPU4 1.25 G tributary slot occupies 1.247% of the OPU4 payload area, and is a structure with 95 columns by 160 (80×4/2) rows plus TSOH. The 80 OPU4 1.25 G TSs are byte interleaved in the OPU4 payload area and the 80 OPU4 TSOHs are frame interleaved in the OPU4 overhead area. The TSOH of OPU4 TSs is located in rows 1 to 3, columns 15 and 16 of the OPU4 frame. TSOH for a 1.25 G tributary slot is available once every 80 frames. An 80-frame multiframe structure is used for this assignment, and the multiframe structure is locked to bits 2 to 8 of an OPU Multi-Frame Identifier (OMFI) byte at row 4, column 16 of each frame.

Figure 4:
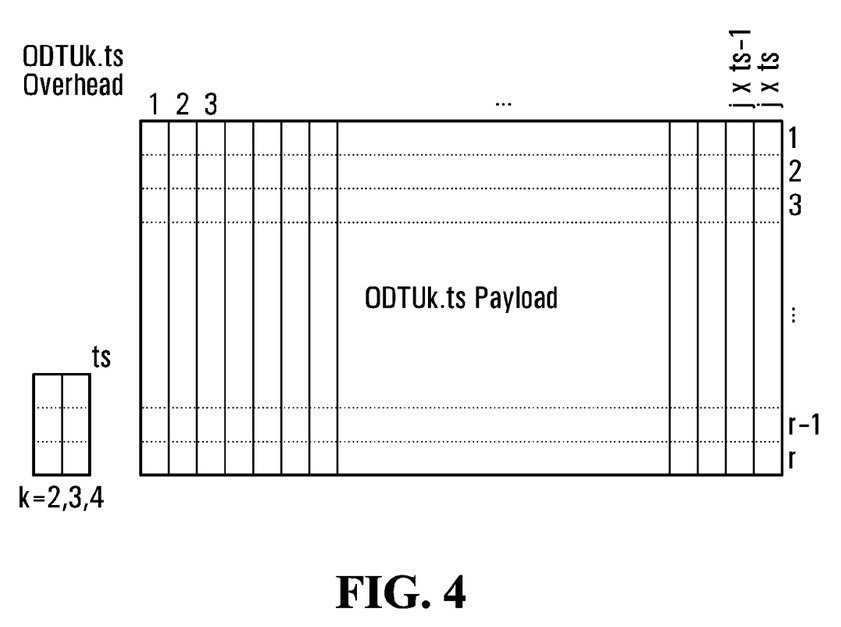
FIG. 4 is a block diagram of an Optical channel Data Tributary Unit (ODTUk.ts) frame structure.

Turning now to the ODTUk.ts signal format, FIG. 4 is a block diagram of an ODTUk.ts frame structure according to G.709. The ODTUk.ts format consists of an ODTUk.ts payload area and an ODTUk.ts overhead area, as shown. The ODTUk.ts payload area has j×ts columns and r rows, and the ODTUk.ts overhead area has 6 bytes. The ODTUk.ts content is carried in "ts" 1.25 G tributary slots of an HO OPUk signal. The location of the ODTUk.ts overhead depends on the HO OPUk TS used when multiplexing the ODTUk.ts content into the HO OPUk signal. The single instance of ODTUk.ts overhead is located in the OPUk TSOH of the last HO OPUk TS allocated to the ODTUk.ts content. The ODTUk.ts overhead carries the GMP justification overhead as specified in clause 19.4 of G.709.

By way of example, j, r, ts, and the number of payload bytes in an ODTUk.ts frame are 119, 128, 1 to 32, and 15232×ts for ODTU3.ts, and 95, 160, 1 to 80, and 15200×ts for ODTU4.ts.

In summary, the bytes of the LO ODUj frame are mapped into the ODTUk.ts payload area using the GMP, and the ODTUk.ts payload area bytes are mapped into one or more HO OPUk TSs. The bytes of the ODTUk.ts justification overhead are mapped into the HO OPUk OH area.

For some implementations of communication devices or equipment, a single stage of encapsulating client signals into OPUk signals and subsequent generation of ODUk and OTUk signals at only one OTN level k might be feasible. In other implementations, however, multiplexing between OTN signal levels or types could be desirable due to existing interfaces, integrated circuits, and/or other components, for instance. Aspects of the present disclosure relate primarily to inter-level signal multiplexing.

Example Signal Format Conversion Apparatus

Figure 5A:
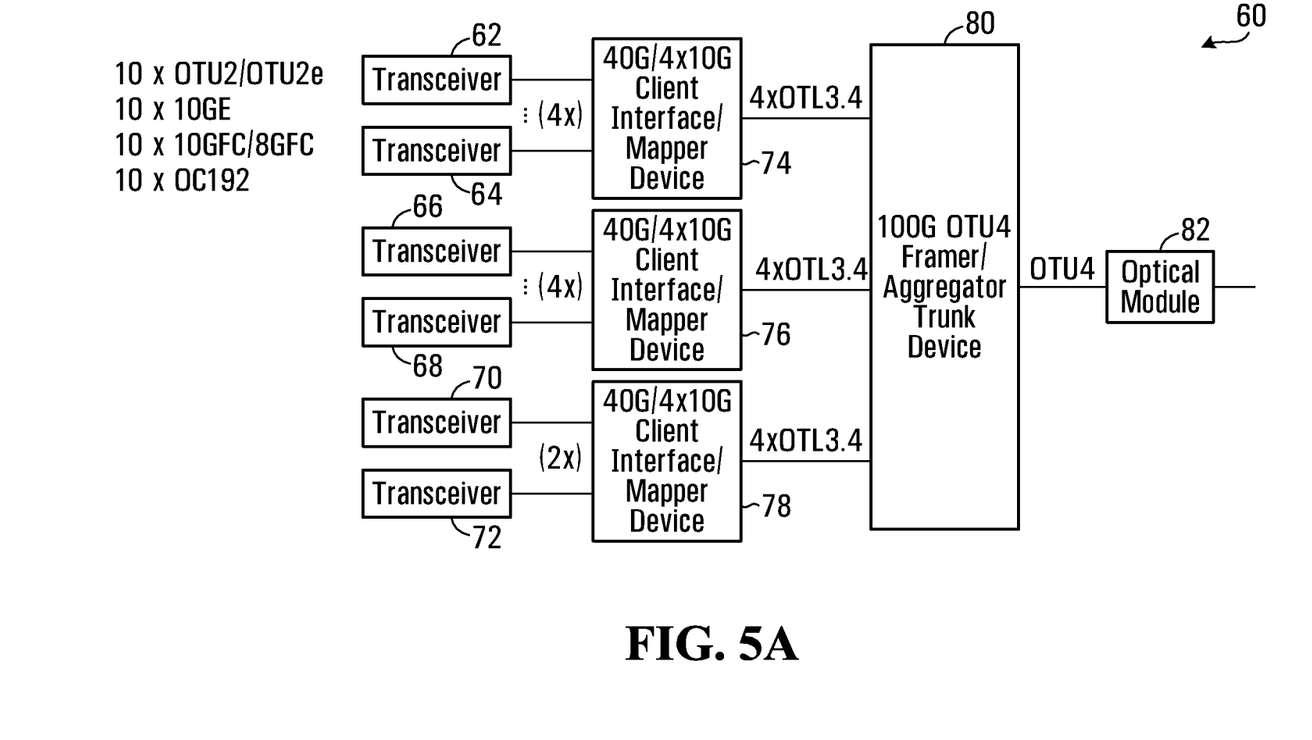
FIG. 5A is a block diagram of an example device supporting translation from one level (k) to another level in the OTN signal hierarchy.

FIG. 5A is a block diagram of an example device supporting translation from one level (k) to another level in the OTN signal hierarchy. The example device 60 includes ten transceivers in total, six of which are shown at 62, 64, 66, 68, 70, 72, three 40 G/4×10 G client interface/mapper devices 74, 76, 78, a 100 G OTU4 framer/aggregator trunk device 80, and an optical module 82. The transceivers 62, 64, 66, 68, 70, 72 could be 10 G XFP or SFP+ (Small Form factor Pluggable) transceivers, for example. In that case, the example device 60 represents a multi-chip solution for a 10×10 G to 100 G muxponder application.

A multi-chip approach as shown in FIG. 5A has some important advantages. For instance, this type of approach can be used to provide a common solution for both 10×10 G and 2×40 G+2×10 G muxponder applications. A multi-chip design could also dramatically simplify the 100 G trunk device 80 by supporting all 10 G-related functions on the 40 G/4×10 G client devices 74, 76, 78. Flexible 10 G class input/output can be supported by the 40 G/4×10 G client devices 74, 76, 78, with an extensive 10 G class termination/monitoring/mapping feature set, for OTN, 10 G Ethernet (10 GE), 10 G/8 G Fibre Channel (FC), and/or Synchronous Optical NETwork (SONET) in the example shown.

In one implementation of a multi-chip solution of the type shown in FIG. 5A, the 40 G/4×10 G client devices 74, 76, 78 support most 10 G-related functions, with the exception of signal format conversion to OTN level 4. The interface between the 40 G/4×10 G client devices 74, 76, 78 and the 100 G trunk device 80 uses 4 Optical channel Transport Lanes (4×OTL3.4) in the example device 60, and the 100 G trunk device 80 handles multiplexing into OPU4 and subsequent generation of ODU4 and OTU4 signals. Although this interface between the 40 G/4×10 G client devices 74, 76, 78 and the 100 G trunk device 80 is shown as 4×OTL3.4 in the example device 60, the interface could instead use OTU3 or ODU3, for example. Aspects of the present disclosure could be applied to this interface.

Figure 5B:
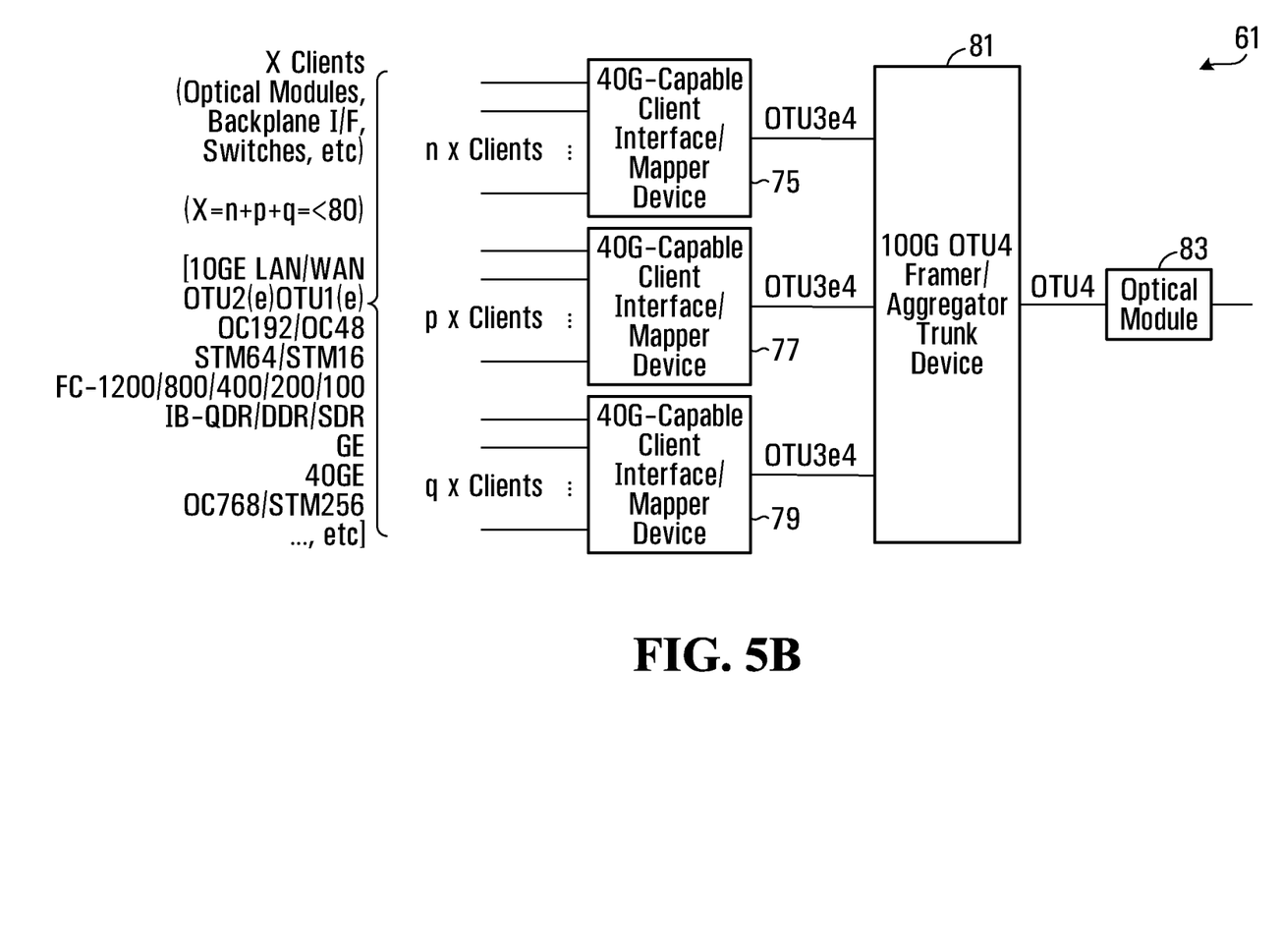
FIG. 5B is a block diagram of another example device supporting translation from one level (k) to another level in the OTN signal hierarchy.

FIG. 5B is a block diagram of another example device that supports translation from one level to another level in the OTN signal hierarchy. The example device 61 is substantially similar to the example device 60 in FIG. 5A, and includes 40 G-capable client interface/mapper devices 75, 77, 79, a 100 G OTU4 framer aggregator trunk device 81, and an optical module 83. Whereas FIG. 5A shows a specific example of ten client signals, FIG. 5B shows a generalized example of "X" client signals, with the client devices 75, 77, 79 handling n, p, and q client signals, respectively. FIG. 5B also shows the option of an OTU interface instead of the OTL interface shown in FIG. 5A.

Additional examples of client signal interfaces and formats are shown in FIG. 5B as well. The example client signal interfaces listed in FIG. 5B include optical modules, equipment backplane interfaces, and switches, and other types of client signal interfaces are also contemplated. Regarding the client signals themselves, 10 GE Local Area Network/Wide Area Network (LAN/WAN), OTU2(e)/OTU1(e), 00192/0048, STM64/STM16, FC-1200/800/400/200/100, InfiniBand IB-QDR/DDR/SDR, GE, 40 GE, and 00768/STM256 are listed as examples in FIG. 5B. The client signals could also or instead include ODU0 signals, ODU flex signals, 1/2/4/8/16/32 GFC signals, and possibly other signal types.

As shown, there may be up to 80 clients in the example device 61, since an HO OPU4 can contain up to 80 ODUj signals, where j=0, 1, 2, 2e, 1e, flex, 3, 3e, 4. Two of the client devices 75, 77, 79 could handle input signals from up to 32 clients each, with the third client device then handling up to 16 clients, depending on the client signal type(s). For example, up to 32×GE/1 GFC/2.5 G InfiniBand client inputs, 16×2 GFC/STM16/OC48 client inputs, 4×10 G Class client inputs, or 8×5 G Infiniband client inputs could be handled by a single client device 75, 77, 79. More generally, n client inputs are aggregated into the 40 G client device 75 in the example shown, with n being 32 or less since a 40 G frame supports up to 32 ODU0 signals, 16 ODU1 signals, 4 ODU2 signals, n ODUflex signals, or any combination of these with n≦32. The other client devices can similarly handle input signals from up to 32 clients, to aggregate a total of up to 80 input signals.

Figure 6:
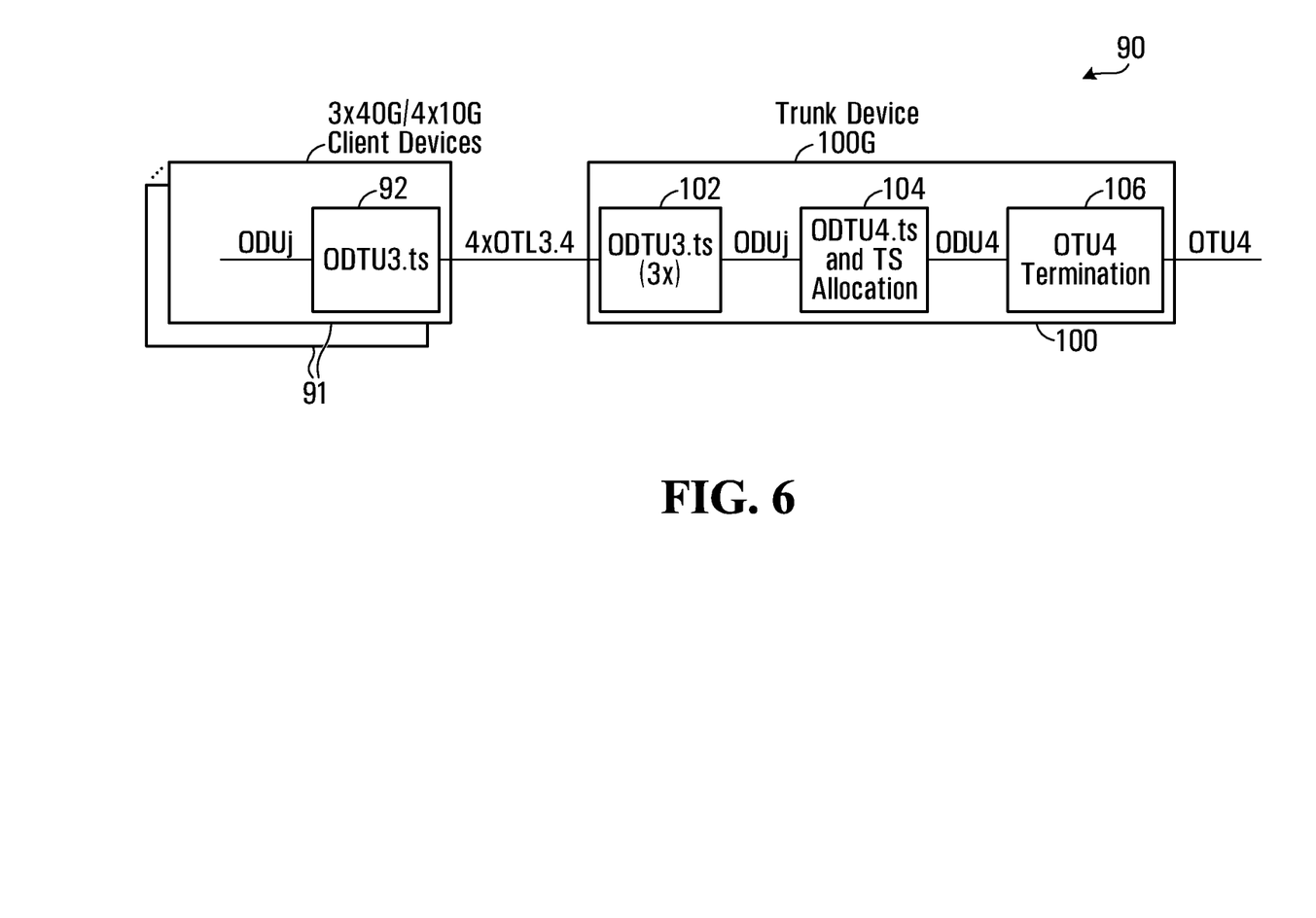
FIG. 6 is a block diagram of an example signal format converter.

FIG. 6 is a block diagram of an example signal format converter 90, which could be used in a device of the type shown in FIG. 5. The converter 90 implements remapping of ODUj (j=0, 1, 2, 2e, 1e, flex) signals between HO ODU3 (multiplexed into OTL3.4) and HO OTU4 by cascading three asynchronous processes. In the 40 G/4×10 G to 100 G direction (left to right in FIG. 6), ODUj (j=0, 1, 2, 2e, 1e, flex) signals can be asynchronously mapped to HO ODU3 signals through ODTU3.ts 92 at each 40 G/4×10 G client device 91. The resultant HO ODU3 signals are multiplexed into OTL3.4 signals in the example shown, transferred to the 100 G trunk device 100, and subsequently asynchronously demapped back to ODUj (j=0, 1, 2, 2e, 1e, flex) signals through ODTU3.ts 102. Another asynchronous mapping through ODTU4.ts is applied to the ODUj (j=0, 1, 2, 2e, 1e, flex) signals, and the ODTU4.ts format is multiplexed into HO OPU4 TS(s) at 104. ODU4 signals are transferred to the OTU4 Termination 106, which generates OTU4 signals. Inverse processes are applied in the 100 G to 40 G/4×10 G direction, with HO ODU4 signals being asynchronously demapped to ODUj (0, 1, 2, 2e, 1e, flex) signals at 104, ODUj (j=0, 1, 2, 2e, 1e, flex) signals being asynchronously mapped to HO ODU3 signals at 102 and multiplexed into OTL3.4 signals in the example shown, and HO ODU3 signals being asynchronously demapped back to ODUj (j=0, 1, 2, 2e, 1e, flex) signals at 92.

Building a 10×10 G muxponder in this way can have several drawbacks. An architecture as shown in FIG. 6 requires a complex and expensive 100 G trunk device 100, with 20 synchronizers (10 per direction). Although the mapping processes between ODUj (j=0, 1, 2, 2e, 1e, flex) signals and ODU4 signals in the 40 G/4×10 G to 100 G direction at 104 and between ODUj (j=0, 1, 2, 2e, 1e, flex) signals and ODU3 signals in the 100 G to 40 G/4×10 G direction at 102 are asynchronous, some computations may be needed to determine where signals are to be mapped. These computations can be performed by elements generally referred to as synchronizers, but the mapping process itself is asynchronous. One synchronizer is used for each 10 G channel, for each of the ODUj (j=0, 1, 2, 2e, 1e, flex) signal to ODU4 signal mappings in the 40 G/4×10 G to 100 G direction at 104 and the ODUj (j=0, 1, 2, 2e, 1e, flex) signal to ODU3 signal mappings in the 100 G to 40 G/4×10 G direction at 102.

In the case of ODU2e signals (i.e., ODUj with j=2e), there is also another potential drawback, in that a standard ODU3 signal using a reference clock at a standard clock rate can only carry 3×ODU2e signals. Therefore, only 3 ODU2e signals could actually be handled per client device 91 in the architecture shown in FIG. 6. This solution would not be applicable to a 10×10 G<->10×ODU2e<->HO OPU4 implementation.

Another possible drawback of the signal format converter architecture shown in FIG. 6 is that it exhibits worse jitter performance than a monolithic solution. The "indirect" mapping from ODU3 signals to ODU4 signals through ODUj (j=0, 1, 2, 2e, 1e, flex) signals as shown is, in effect, like transiting through an additional network element.

In some embodiments, the 20 synchronizers on the 100 G trunk device 100 can be eliminated by generating/interpreting ODTU4.ts justifications on the companion 40 G/4×10 G client devices 91 and overclocking the ODU3 signals with a non-standard rate based on the ODU4 rate. The conversion process then reduces to:

ODU2→async map→HO ODU3e4→reformatting→HO OTU4 in the 10 G to 100 G direction, and ODU2←async demap←HO ODU3e4←reformatting← HO OTU4 in the 100 G to 10 G direction, where HO ODU3e4 indicates an overclocked ODU3 signal having the same structure as a standard ODU3 signal but with a different reference clock rate based on and synchronized with the HO ODU4 transmit and receive clock rate(s).

This not only eliminates the 20 synchronizers from the 100 G trunk device 100, but also simplifies the ODU3e4 to OTU4 conversion to a reformatting process instead of a demapping/remapping process.

The ODU3e4 is synchronized to the ODU4 to make sure that the periods of the ODTU3e4.ts and ODTU4.ts structures match:

$$T_{ODTU3e4.ts} = T_{ODTU4.ts}$$

$$\Rightarrow 32*T_{ODU3e4} = 80*T_{ODU4}$$

$$\Rightarrow 32/f_{ODU3e4} = 80/f_{ODU4}$$

$$\Rightarrow f_{ODU3e4} = f_{ODU4}*2/5,$$

and similarly, $$f_{OTU3e4} = f_{OTU4}*2/5.$$

As noted above, the nominal signal rate for ODU4 signals is 239/227×99,532,800 kbps. Therefore, in one embodiment, the nominal signal rate of HO ODU3e4 signals is 2/5×239/227×99,532,800 kbps, or 239/227×39,813,120 kbps (+/−20 ppm), compared to 239/236×39,813,120 kbps for standard rate ODU3 signals.

The ODTU3e4.ts and the resultant ODU3e4 structures remain the same as ODTU3.ts and ODU3 in G.709, but are clocked at a slightly different rate that is synchronized to the level 4 rate.

Figure 7:
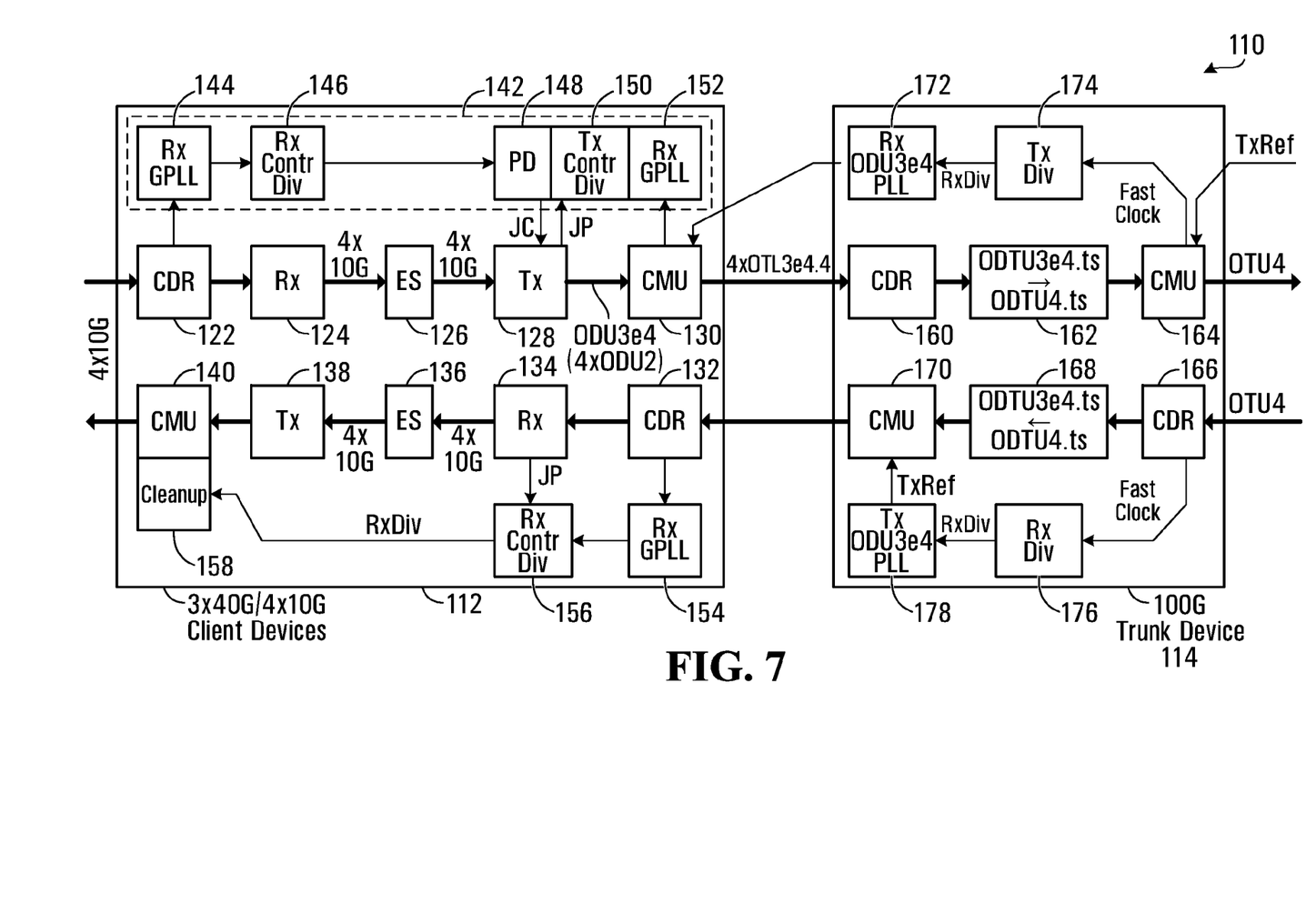
FIG. 7 is a block diagram of an example apparatus according to one embodiment.

FIG. 7 is a block diagram of an example apparatus 110 according to one embodiment, in which ODU3e4 signals, which are generated on 40 G/4×10 G client devices 112, are synchronized to OTU4 signals generated on a 100 G trunk device 114.

Each 40 G/4×10 G client device 112 in the example apparatus 110 includes a data plane with a Clock and Data Recovery (CDR) module 122, 132 for the 40 G/4×10 G to 100 G direction (left to right) and the 100 G to 40 G/4×10 G direction. Receivers 124, 134, elastic stores 126, 136, transmitters 128, 138, and Clock Multiplier Units (CMUs) 130, 140 are also provided for each direction. In the timing plane, each 40 G/4×10 G client device includes a receive Phase Lock Loop (PLL), which is a Gated PLL (GPLL) 144 in the example shown. A receive controlled divider 146 is coupled to the receive GPLL 144 and to a Phase Detector (PD) 148. Another receive GPLL 152 is coupled to the CMU 130 and to a transmit controlled divider 150, which is coupled to the PD 148. These timing plane elements represent one example of a signal rate controller 142. The receive GPLL 154 and the receive controlled divider 156 operate on clock signals recovered from received 40 G signals by the CDR 132, and the resultant divided receive clock RxDiv is cleaned up at 158 to filter out mapping jitter resulting from ODU2 to ODTU3e4 mapping.

At the 100 G trunk device 114, a CDR 160, 166 and a CMU 164, 170 are provided for each direction. ODTU3e4.ts signals are converted into ODTU4.ts signals in a format converter 162 for the 40 G/4×10 G to 100 G direction, and an inverse conversion can be applied at a format converter 168 in the 100 G to 40 G/4×10 G direction. The Rx and Tx fractional dividers 174, 176 implement OTU4 clock conversion, and two cleanup PLLs, shown as Rx ODU3e4 PLL 172 and Tx ODU3e4 PLL 178 can be used to clean up clock jitter, to provide chip-to-chip clock cleanup.

Aspects of the present disclosure relate to the ODU3e4 signals, synchronization of associated reference clocks at the 40 G/4×10 G client devices 112 with transmit and receive reference clocks at the 100 G trunk device 114, and the converters at 162, 168.

In operation, for the 40 G/4×10 G to 100 G direction, the CDR 122 recovers clock signals and data signals, provides the clock signals to the receive GPLL 144, and provides the data signals to the receiver 124. The receiver 124 performs various receiver functions, which for 10 GE signals might include non-intrusive monitoring, stripping of headers, etc. Processed data signals are stored in the ES 126, which is a First-In First-Out (FIFO) storage element. The transmitter 128 converts 10 G signals into ODU3e4 signals in the example shown. The PD 148 provides Justification Control (JC) for the transmitter 128, based on a comparison of phase between a clock signal recovered by the CDR 122 and provided to the receive controlled divider 146 through the receive GPLL 144, and a synthesized clock signal output by the CMU 130 to the transmit controlled divider 150 through the receive GPLL 152. When a justification (positive or negative) is applied by the transmitter 128, this is reported to the transmit control divider 150, as shown at JP in FIG. 7.

At the 100 G trunk device 114, the CDR 160 receives 40 G ODU3e4 frames in OTL3e4.4 signals in the example shown, and the format converter 162 reformats from ODTU3e4.ts to ODTU4.ts. This is a reformatting function, and not an asynchronous demapping or remapping, as described below. The CMU 164 outputs OTU4 signals, based on a transmit reference clock signal TxRef. The TxRef signal is also output to the transmit divider 174, and the divided reference clock signal is cleaned up in the Rx ODU3e4 PLL 172 and provided to the 40 G/4×10 G client device CMU 130. This enables the ODU3e4 at the 40 G/4×10 G client devices 112 to be synchronized to the OTU4 transmit reference clock TxRef, which in turn enables the subsequent ODTU3e4.ts to ODTU4.ts conversion to be reduced to a much simpler reformatting rather than asynchronous demapping/remapping.

Operation in the 100 G to 40 G/4×10 G direction is substantially similar, in that the ODU3e4 signals received from the 100 G trunk device 114 by the 40 G/4×10 G client devices 112 are synchronized with the OTU4 signals. In this direction, however, separate feedback of the divided TxRef clock is not required, since the reference clock can be recovered by the CDR 132.

In the 40 G/4×10 G to 100 G "aggregation" direction, OxU3e4 signal outputs, which could each be a 4xOTL3e4.4 interface as shown, from the 40 G/4×10 G client devices 112 to the 100 G trunk device 114 are source-synchronous with the transmitted OTU4(V) line signal. The signal rate of the transmitted ODU4 signal is 5/2 times the signal rate of the ODU3e4 signals from the 40 G/4×10 G client devices 112. In the opposite "de-aggregation" direction, the OxU3e4 outputs, which similarly could each be a 4xOTL3e4.4 interface, from the 100 G trunk device 114 to the 40 G/4×10 G client devices 112 are source-synchronous with the received OTU4(V) line signal, such that the signal rate of the received ODU4 signal is 5/2 times the signal rate of the ODU3e4 signals that are output to the 40 G/4×10 G client devices. It should be noted, however, that the transmit and receive ODU4 signals need not be synchronous with each other.

As discussed above, there is typically no synchronization between different OTN signal types or levels. Thus, a divided transmit reference clock would not normally be provided from the 100 G trunk device 114 to the 40 G/4×10 G client devices 112. This type of synchronization not only represents a departure from G.709, but would run counter to past practices in at least certain communication equipment architectures. For example, in some architectures it might be desirable to use the 40 G/4×10 G client devices 112 and/or the 100 G trunk device 114 in a stand-alone mode. In some embodiments, the clocking arrangement shown in FIG. 7 would preclude the use of the devices 112, 114 in stand-alone mode.

An apparatus according to one embodiment might include a format converter to convert data signals between a first signal format associated with a first reference clock rate and a second signal format different from the first signal format and associated with a second reference clock rate different from the first reference clock rate. With reference to FIG. 7, such a format converter could be implemented at each of the 40 G/4×10 G client devices 112 to convert between ODU2 and ODU3e4 signals, in each transmitter 128 and receiver 134.

A reference clock rate controller could be coupled to the format converter, to change a period of the second signal format to match a period of a third signal format by controlling a synchronized second reference clock rate applied by the format converter in converting data signals between the first signal format and the second signal format. The synchronized second reference clock rate is different from the second reference clock rate and is synchronized with a third reference clock rate that is associated with the third signal format. Referring again to FIG. 7, this type of reference clock rate control is provided by the TxRef feedback from the 100 G trunk device 114 to the 40 G/4×10 G devices 112 and the example signal rate controller 142 for the 40 G/4×10 G direction, and by recovery of the TxRef clock by the CDR 132 in the opposite direction. Thus, both the signal rate controller 142 and the CDR 132 represent examples of a reference clock rate controller.

Application of reference clock synchronization to ODTU signal formats has been described in detail above. These ODTU signal formats could include respective ODTUkj signal formats, where k=2 or 3 and j=4, or ODTU3.ts and ODTU4.ts, for example.

In an embodiment, the synchronized second reference clock rate is a rational fractional multiple of the third reference clock rate. For example, the synchronized second reference clock rate and the third reference clock rate could be approximately 40 Gbps and 100 Gbps, respectively.

This type of apparatus could be implemented in a first integrated circuit in communication equipment. That equipment might include a second integrated circuit with a further format converter (e.g., 162, 168 in FIG. 7), to convert data signals between the second signal format and the third signal format. The devices 112, 114 in FIG. 7 are examples of the first and second integrated circuits. As shown in FIG. 7, the first integrated circuit could include a transmitter 128 to transmit signals with content from signals in the second signal format to the second integrated circuit. FIG. 7 also shows a divider 174 to receive and divide a reference clock signal having the third reference clock rate, and a connection to the first integrated circuit to provide a divided reference clock signal TxRef from the divider to the first integrated circuit.

The format converter in the first integrated circuit might convert data signals between the first signal format and the second signal format according to an asynchronous mapping procedure. Reference clock rate control and synchronization enable the further format converter in the second integrated circuit to convert data signals between the second signal format and the third signal format according to a synchronous reformatting procedure. Examples of an asynchronous mapping procedure include OTN AMP and GMP. The synchronous reformatting procedure could involve copying timing information and redistributing payload information between signals in the second format and signals in the third format.

Example Signal Format Conversion Processes

Figure 8:
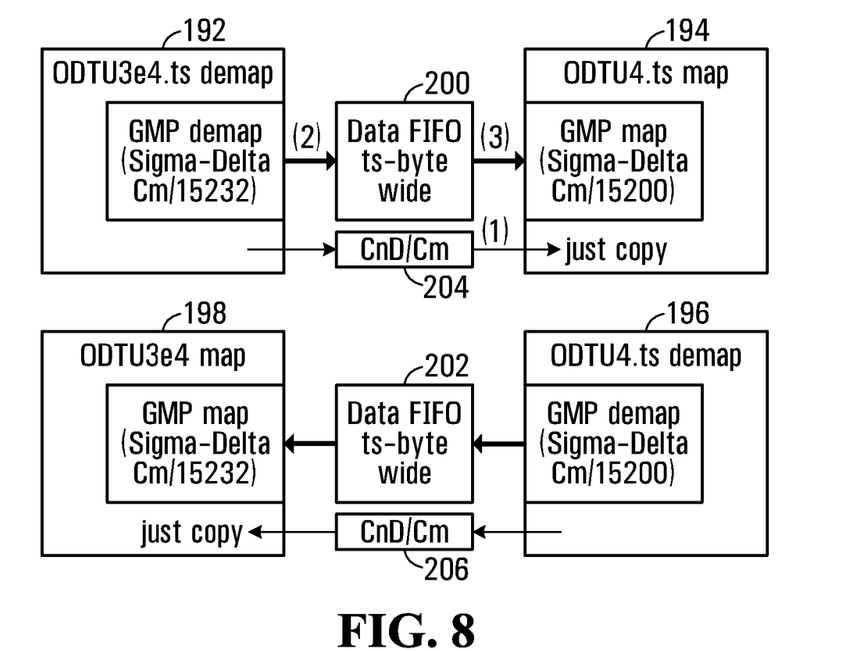
FIGS. 8 and 9 are block diagrams illustrating an example format conversion process according to another embodiment.
Figure 9:
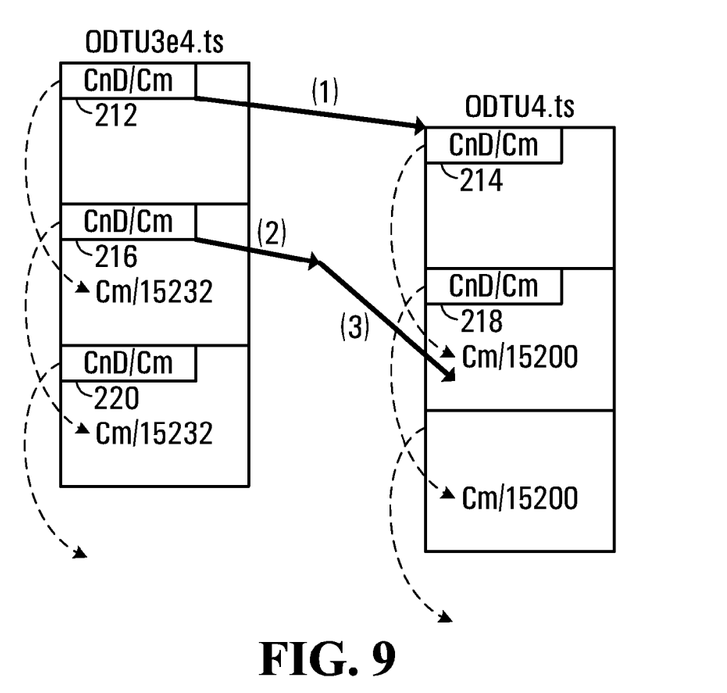

FIGS. 8 and 9 are block diagrams illustrating an example format conversion process according to another embodiment. In the example shown, each ODTUk.ts (k=3e4, 4) structure has a different size. Standard ODTU3.ts carries 15232*ts data bytes, whereas ODTU4.ts carries 15200*ts bytes due to 8 columns of fixed stuff bytes. However, if both structures are forced to have the same period, by changing the reference clock used for k=3 based on the OTU4 transmit/receive clock as described above, then the number of client bytes (Cm) and the timing information (CnD/Cm) will be the same. The resultant ODTU3e4.ts structure would then carry 32 additional stuffing words, but other than being overclocked, is a standard ODTU3.ts structure.

Although FIG. 8 refers to demap and map, it should be noted that demapping and mapping in FIG. 8 are synchronous. The functions of demapping and mapping are performed without a sub-function of synchronization/desynchronization. Justification control indication (JC1,2,3,4,5,6) Bytes are just copied from multiframe to multiframe from/to the ODTU3e4.ts to/from the ODTU4.ts structure, so that there is no synchronization function. The data and stuff locations are recalculated using a sigma-delta algorithm as per GMP standard mapping in the example shown, and data/stuff information is remapped from one ODTU entity to the other ODTU entity to avoid complex frame/multiframe synchronization between the ODU4 and the 3×ODU3e4, which would be across the four devices (three 40 G/4×10 G client devices 112 and a 100 G trunk device 114) in the example apparatus shown in FIG. 7, for instance.

The demapping and mapping, or "remapping", work similarly in the ODTU3e4.ts→ODTU4.ts and ODTU4.ts→ODTU3e4.ts directions. As an example, the following steps are involved in the ODTU3e4.ts→ODTU4.ts remapping in one embodiment:

copy the Cnd/Cm values 204, 212, 216, 220 from the incoming ODTU3e4.ts into the outgoing ODTU4.ts, as shown at 214, 218 in FIG. 9;

demap the data from the ODTU3e4.ts, by writing it to a FIFO 200 using the Cm/15232 Sigma-Delta (SD) sequence; and read the data from the FIFO 200 and map it into the ODTU4.ts using the same Cm value and the new Cm/15200 SD sequence.

The ODTU4.ts timing information and data would be similarly reformatted into ODTU3e4.ts by copying the CnD/Cm values 206, writing the data to the FIFO 202, and reading the data from the FIFO.

Calculation of the SD sequences, in one embodiment, is in accordance with Annex D of G.709.

Figure 10:
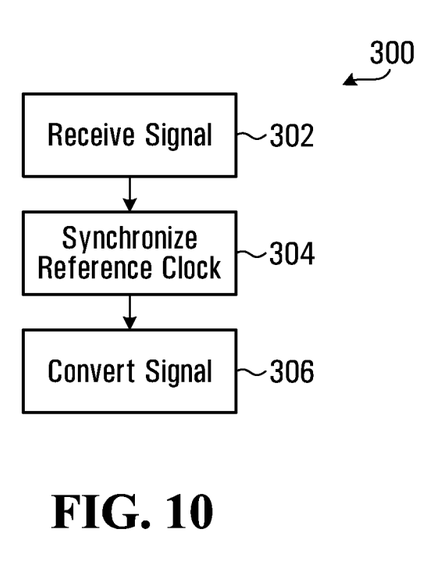
FIG. 10 is a flow diagram showing an example method according to a further embodiment.

FIG. 10 is a flow diagram showing an example method according to yet another embodiment. The example method 300 involves receiving data signals at 302, in one of a first signal format associated with a first reference clock rate and a second signal format that is different from the first signal format and is associated with a second reference clock rate different from the first reference clock rate. At 304, a period of the second signal format is changed to match a period of a third signal format, by synchronizing a reference clock rate, for application in converting data signals between the first signal format and the second signal format, to a third reference clock rate that is associated with the third signal format. The synchronized reference clock rate is different from the second reference clock rate. Received data signals are converted to the other of the first signal format and the second signal format using the synchronized reference clock rate, at 306.

The example method 300 represents one embodiment of the present disclosure. Other embodiments may involve fewer, further, or different operations performed in a similar or different order than shown. Options for performing the operations shown in FIG. 10, and/or other variations in the example method 300, may be or become apparent, from the disclosure of apparatus embodiments for instance.

What has been described is merely illustrative of embodiments. Other arrangements and methods can be implemented by those skilled in the art.

For example, the foregoing description and the contents of the drawings are intended solely for illustrative purposes. Actual implementations may include further, fewer, or different elements interconnected in a similar or different manner than shown and/or described.

In addition, although described herein primarily in the context of OTN and OPU/ODU/OTU 3 and 4 as an illustrative example, the disclosed techniques could be applied to other types of signals.

We claim:

1. An apparatus comprising:
   a format converter to convert data signals between a first signal format associated with a first reference clock rate and a second signal format different from the first signal format and associated with a second reference clock rate different from the first reference clock rate;
   a reference clock rate controller, coupled to the format converter, to change a period of the second signal format to match a period of a third signal format by controlling a synchronized second reference clock rate applied by the format converter in converting data signals between the first signal format and the second signal format, the synchronized second reference clock rate being different from the second reference clock rate and synchronized with a third reference clock rate, the third reference clock rate being associated with the third signal format.

2. The apparatus of claim 1, the second signal format and the third signal format comprising respective Optical channel Data Tributary Unit (ODTU) signal formats.

3. The apparatus of claim 2, the ODTU signal formats comprising respective ODTUkj signal formats, where k=2 or 3 and j=4.

4. The apparatus of claim 2, the second signal format comprising ODTU3.ts, and the third signal format comprising ODTU4.ts.

5. The apparatus of claim 1, the synchronized second reference clock rate being a rational fractional multiple of the third reference clock rate.

6. The apparatus of claim 5, the synchronized second reference clock rate and the third reference clock rate being approximately 40 Gbps and 100 Gbps, respectively.

7. Communication equipment comprising:
   the apparatus of claim 1, implemented in a first integrated circuit; and
   a second integrated circuit comprising a further format converter, operatively coupled to the format converter, to convert data signals between the second signal format and the third signal format.

8. The communication equipment of claim 7, the first integrated circuit comprising a transmitter to transmit signals comprising content from signals in the second signal format to the second integrated circuit, the second integrated circuit further comprising:
   a divider to receive and divide a reference clock signal having the third reference clock rate; and
   a connection to the first integrated circuit to provide a divided reference clock signal from the divider to the first integrated circuit.

9. The communication equipment of claim 7, the format converter converting data signals between the first signal format and the second signal format according to an asynchronous mapping procedure, the further format converter converting data signals between the second signal format and the third signal format according to a synchronous reformatting procedure.

10. The communication equipment of claim 9, the asynchronous mapping procedure comprising Optical Transport Network (OTN) Asynchronous Mapping Procedure (AMP) or Generic Mapping Procedure (GMP), the synchronous reformatting procedure comprising copying timing information and redistributing payload information between signals in the second format and signals in the third format.

11. A method comprising:
   receiving data signals in one of a first signal format associated with a first reference clock rate and a second signal format different from the first signal format and associated with a second reference clock rate different from the first reference clock rate;
   changing a period of the second signal format to match a period of a third signal format by synchronizing a reference clock rate, for application in converting data signals between the first signal format and the second signal format, to a third reference clock rate associated with the third signal format, the synchronized reference clock rate being different from the second reference clock rate; and converting the received data signals to the other of the first signal format and the second signal format using the synchronized reference clock rate.

12. The method of claim 11, the second signal format and the third signal format comprising respective Optical channel Data Tributary Unit (ODTU) signal formats.

13. The method of claim 12, the ODTU signal formats comprising respective ODTUkj signal formats, where k=2 or 3 and j=4.

14. The method of claim 12, the second signal format comprising ODTU3.ts, and the third signal format comprising ODTU4.ts.

15. The method of claim 11, the synchronized reference clock rate being a rational fractional multiple of the third reference clock rate.

16. The method of claim 15, the synchronized reference clock rate and the third reference clock rate being approximately 40 Gbps and 100 Gbps, respectively.

17. The method of claim 11, further comprising:
converting data signals between the second signal format and the third signal format.

18. The method of claim 17, further comprising:
receiving a reference clock signal having the third reference clock rate; and
dividing the received reference clock signal,
the synchronizing comprising generating the synchronized reference clock rate based on the divided reference clock signal.

19. The method of claim 17, wherein converting the received data signals to the other of the first signal format and the second signal format comprises converting according to an asynchronous mapping procedure, and wherein converting data signals between the second signal format and the third signal format comprises converting according to a synchronous reformatting procedure.

20. An apparatus comprising:
means for receiving data signals in one of a first signal format associated with a first reference clock rate and a second signal format different from the first signal format and associated with a second reference clock rate different from the first reference clock rate;

means for changing a period of the second signal format to match a period of a third signal format by synchronizing a reference clock rate, for application in converting data signals between the first signal format and the second signal format, to a third reference clock rate associated with the third signal format, the synchronized reference clock rate being different from the second reference clock rate; and means for converting the received data signals to the other of the first signal format and the second signal format using the synchronized reference clock rate.

* * * * *